United States Patent
Meyers et al.

(10) Patent No.: US 10,602,861 B2
(45) Date of Patent: Mar. 31, 2020

(54) DIGITAL VANITY MIRROR ASSEMBLY

(71) Applicants: Ksenia Meyers, North Miami Beach, FL (US); Oscar Boveda, North Miami Beach, FL (US)

(72) Inventors: Ksenia Meyers, North Miami Beach, FL (US); Oscar Boveda, North Miami Beach, FL (US)

(*) Notice: Subject to any disclaimer, the term of this patent is extended or adjusted under 35 U.S.C. 154(b) by 0 days.

(21) Appl. No.: 16/026,810

(22) Filed: Jul. 3, 2018

(65) Prior Publication Data
US 2020/0008592 A1    Jan. 9, 2020

(51) Int. Cl.
| | |
|---|---|
| *A47G 1/02* | (2006.01) |
| *F21V 33/00* | (2006.01) |
| *H04R 1/08* | (2006.01) |
| *G06F 3/041* | (2006.01) |
| *H04N 5/225* | (2006.01) |

(52) U.S. Cl.
CPC .............. *A47G 1/02* (2013.01); *F21V 33/004* (2013.01); *G06F 3/0412* (2013.01); *G06F 3/0416* (2013.01); *H04N 5/2252* (2013.01); *H04R 1/083* (2013.01)

(58) Field of Classification Search
CPC ....... A47G 1/02; G06F 3/0412; G06F 3/0416; H04N 5/2252; H04R 1/083; F21V 33/004
USPC ...................................................... 52/785.1
See application file for complete search history.

(56) References Cited

U.S. PATENT DOCUMENTS

| | | | |
|---|---|---|---|
| D261,817 S | 11/1981 | Kretschmer | |
| 5,566,224 A * | 10/1996 | ul Azam | B60R 1/12 455/566 |
| 9,022,588 B2 * | 5/2015 | Chino | B60R 1/072 359/871 |
| 9,122,320 B1 | 9/2015 | Rowles | |
| 9,609,222 B1 * | 3/2017 | Rowles | G06F 3/0317 |
| 2002/0080494 A1 | 6/2002 | Mcinc | |
| 2007/0040033 A1 * | 2/2007 | Rosenberg | A47G 1/02 235/462.36 |
| 2012/0069444 A1 * | 3/2012 | Campbell | B60R 1/12 359/630 |
| 2012/0307490 A1 * | 12/2012 | Ellis | F21V 3/049 362/235 |
| 2013/0145272 A1 | 6/2013 | Boggie | |

(Continued)

FOREIGN PATENT DOCUMENTS

WO    WO2008108558    9/2008

*Primary Examiner* — Jeanette E Chapman

(57) ABSTRACT

A digital vanity mirror assembly includes a mirror that has a reflective surface being directed toward a user to provide a reflection for personal grooming. A pedestal is positionable on a horizontal support surface and the mirror is coupled to the pedestal such that the mirror is supported above the horizontal support surface. A control circuit is coupled to the mirror and a transceiver is coupled to the mirror. The transceiver is in electrical communication with an extrinsic communication network to facilitate two way communication between the user and a remote individual when the user is viewing the mirror. A touch screen is integrated into the reflective surface of the mirror and the touch screen is electrically coupled to the control circuit for controlling operational parameters of the control circuit and the transceiver. Moreover, the touch screen displays indicia received from the transceiver and a remote control is provided that is in wireless communication with the transceiver.

6 Claims, 6 Drawing Sheets

(56) References Cited

U.S. PATENT DOCUMENTS

| | | |
|---|---|---|
| 2015/0205183 A1 | 7/2015 | Gsellman |
| 2016/0111017 A1 | 4/2016 | Chan |
| 2017/0238401 A1* | 8/2017 | Sadwick .................. A61N 5/01 |
| | | 315/294 |
| 2017/0200000 A1 | 9/2017 | Bertolet |
| 2017/0323364 A1 | 11/2017 | Schmitz-Le Hanne |
| 2018/0263362 A1* | 9/2018 | Yang ........................ A47G 1/04 |

* cited by examiner

DIGITAL VANITY MIRROR ASSEMBLY

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to vanity devices and more particularly pertains to a new vanity device for combining multimedia with personal grooming.

BRIEF SUMMARY OF THE INVENTION

An embodiment of the disclosure meets the needs presented above by generally comprising a mirror that has a reflective surface being directed toward a user to provide a reflection for personal grooming. A pedestal is positionable on a horizontal support surface and the mirror is coupled to the pedestal such that the mirror is supported above the horizontal support surface. A control circuit is coupled to the mirror and a transceiver is coupled to the mirror. The transceiver is in electrical communication with an extrinsic communication network to facilitate two way communication between the user and a remote individual when the user is viewing the mirror. A touch screen is integrated into the reflective surface of the mirror and the touch screen is electrically coupled to the control circuit for controlling operational parameters of the control circuit and the transceiver. Moreover, the touch screen displays indicia received from the transceiver and a remote control is provided that is in wireless communication with the transceiver.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
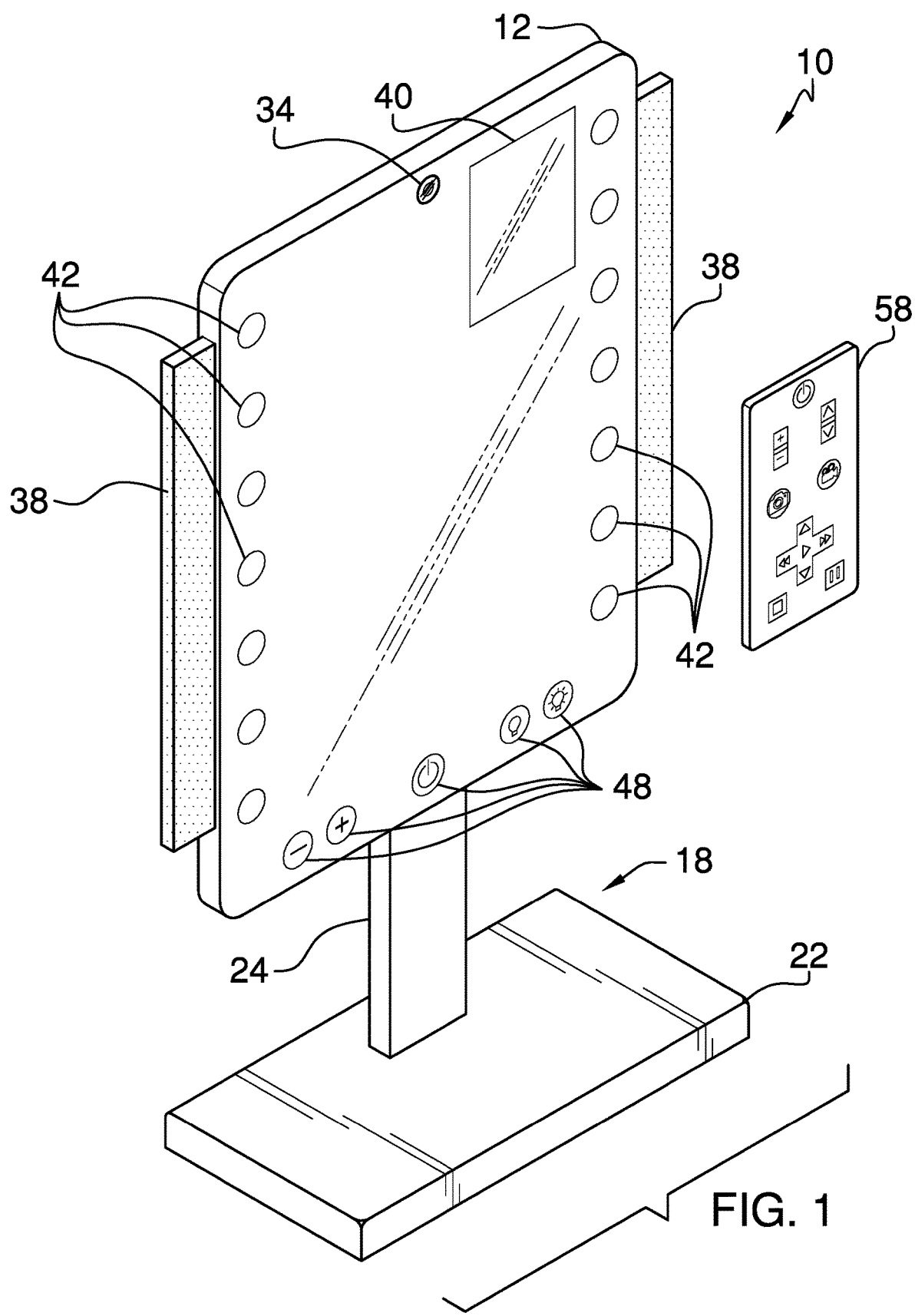
FIG. 1 is a front perspective view of a digital vanity mirror assembly according to an embodiment of the disclosure.
Figure 2:
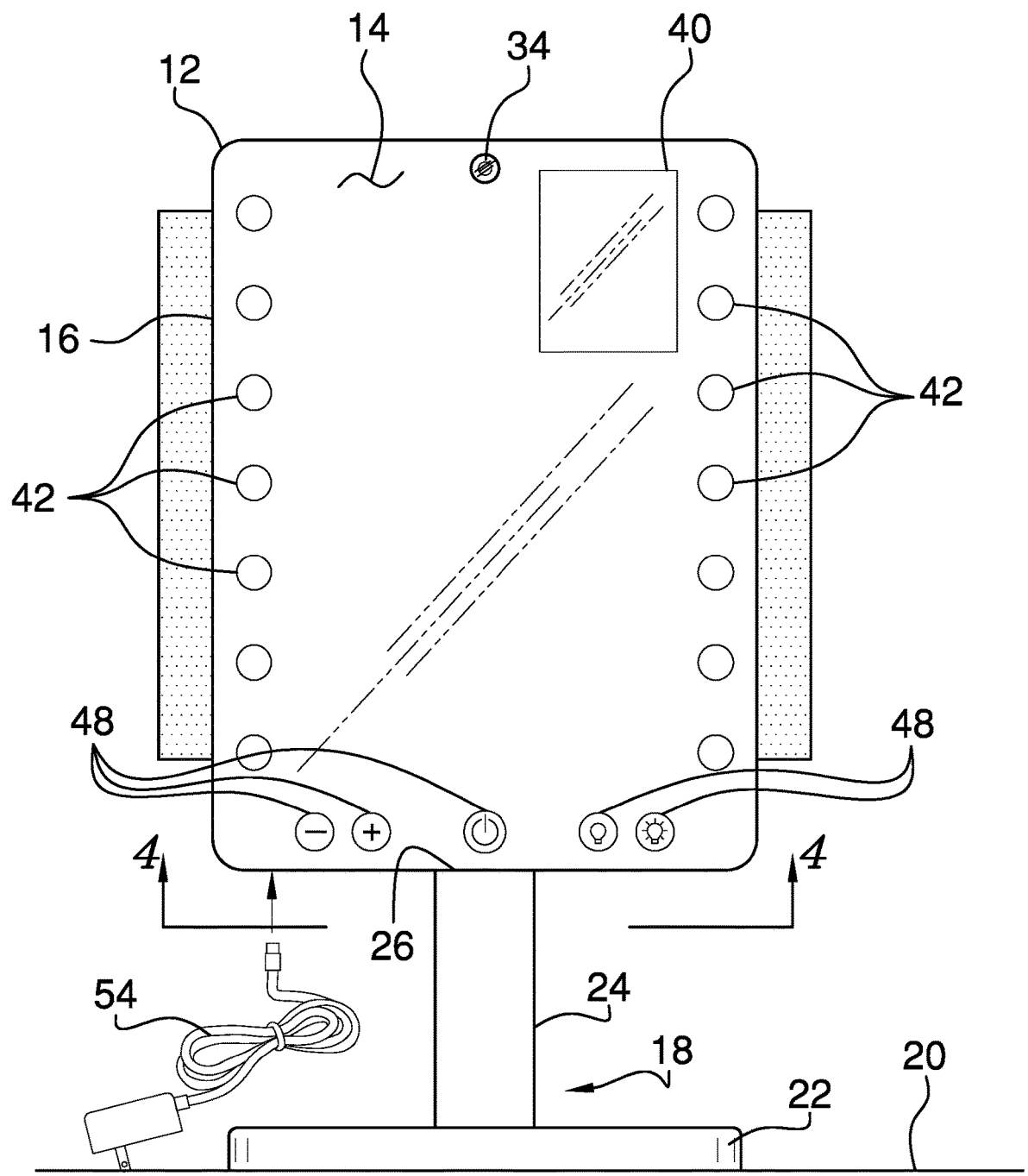
FIG. 2 is a front view of an embodiment of the disclosure.
Figure 3:
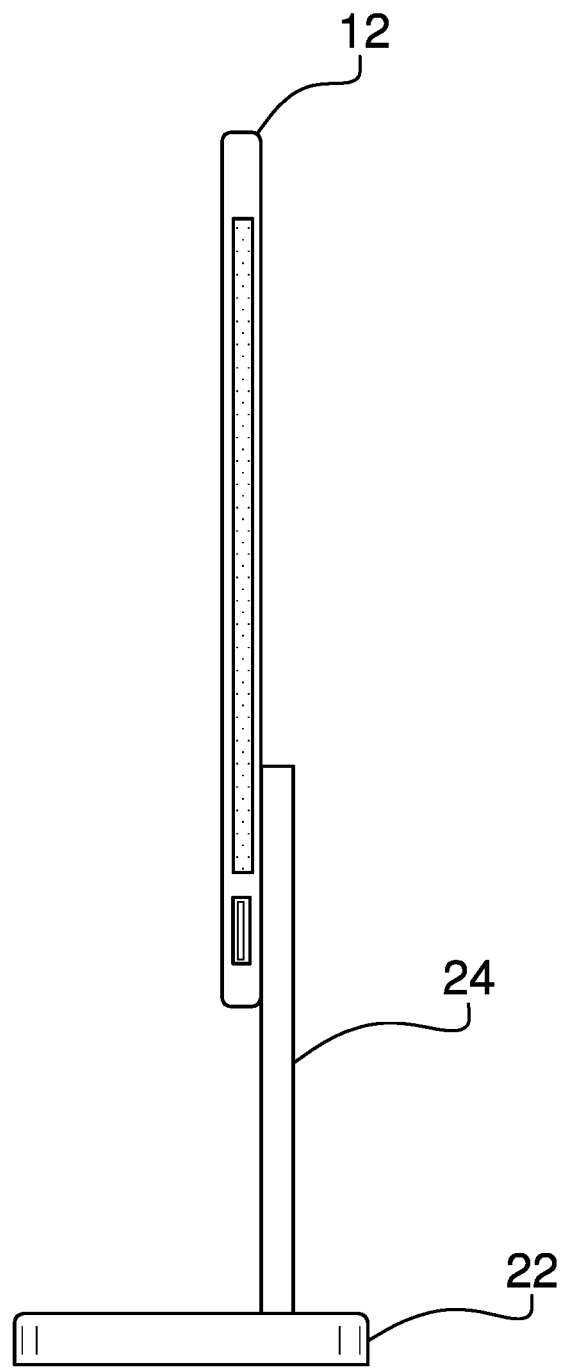
FIG. 3 is a left side view of an embodiment of the disclosure.
Figure 4:
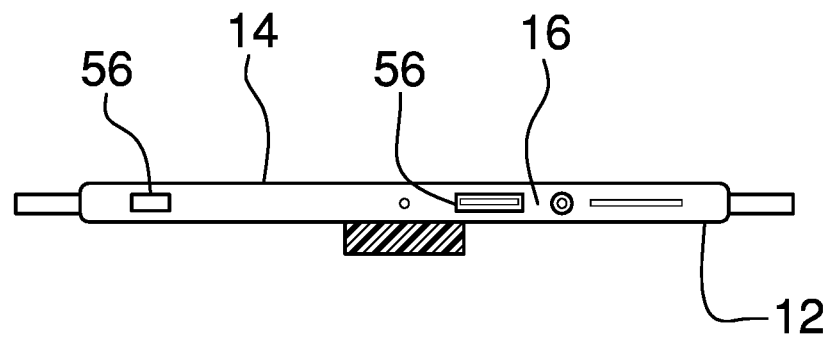
FIG. 4 is a cross sectional view taken along line 4-4 of FIG. 2 of an embodiment of the disclosure.
Figure 5:
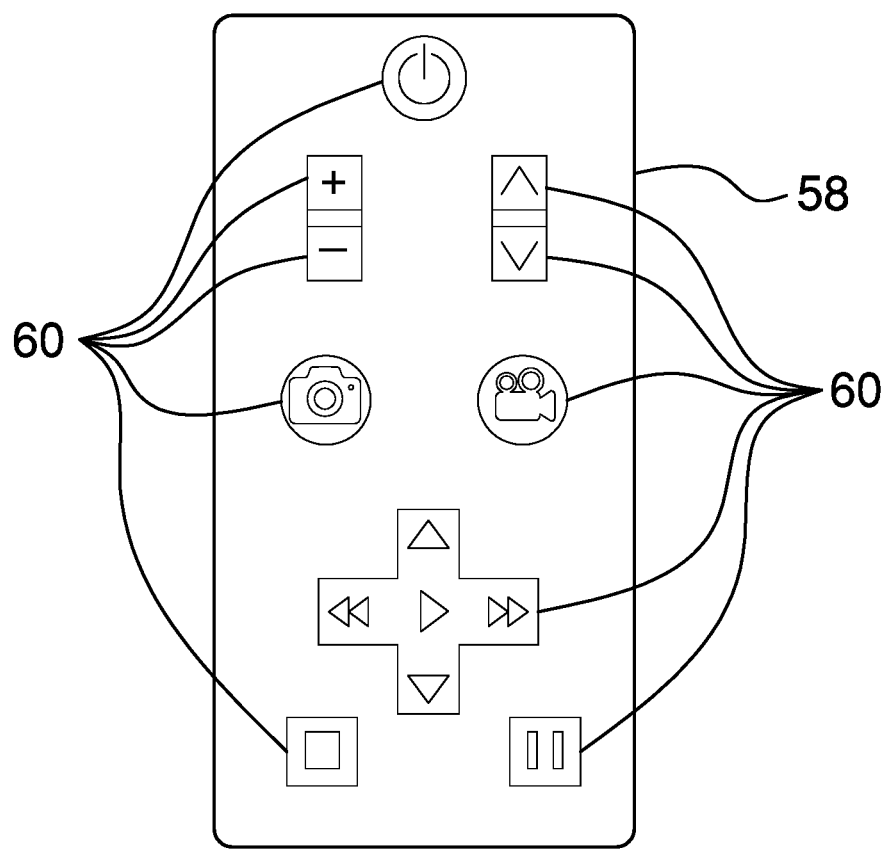
FIG. 5 is a front view of remote control of an embodiment of the disclosure.
Figure 6:
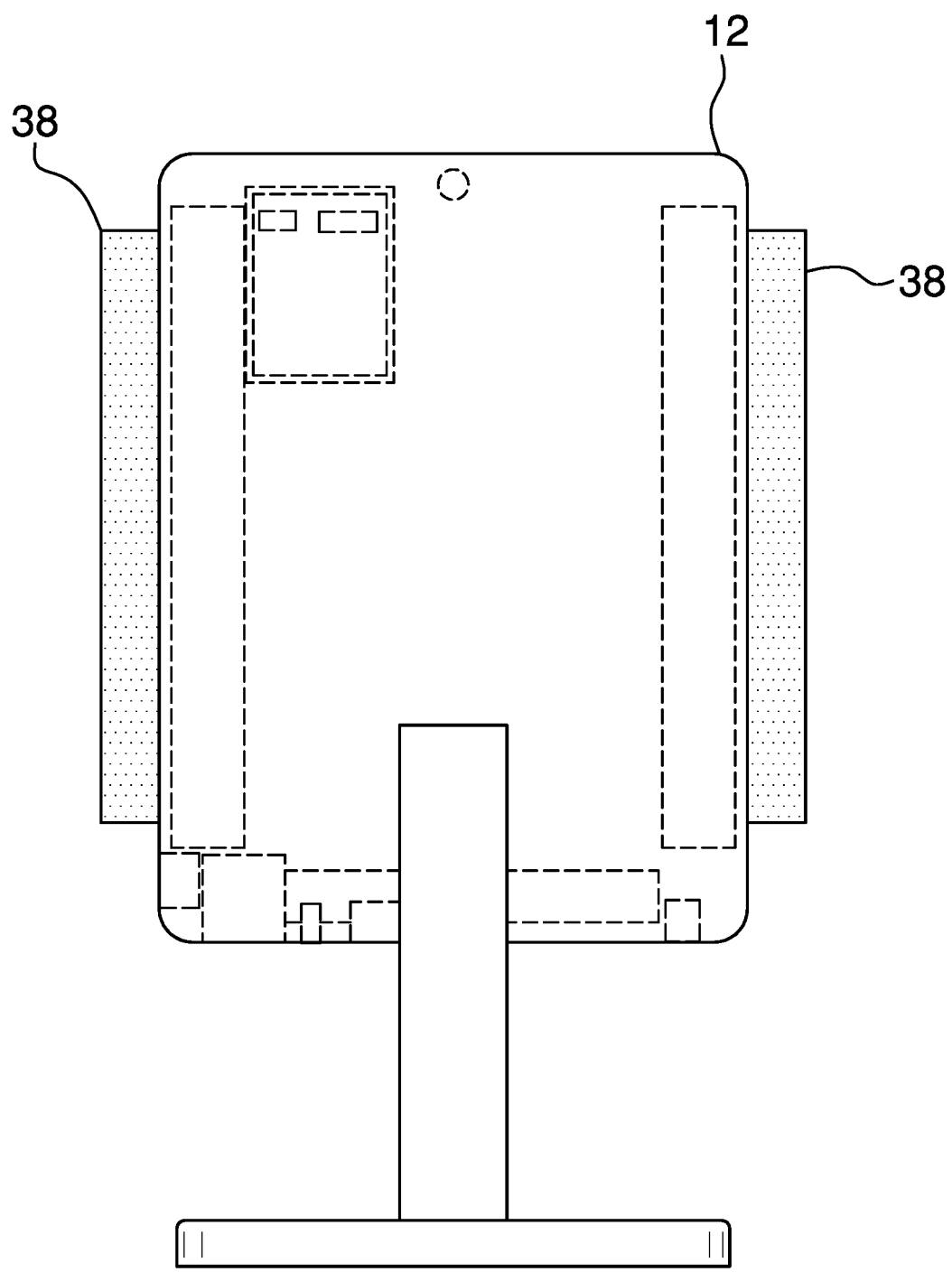
FIG. 6 is a back phantom view of an embodiment of the disclosure.
Figure 7:
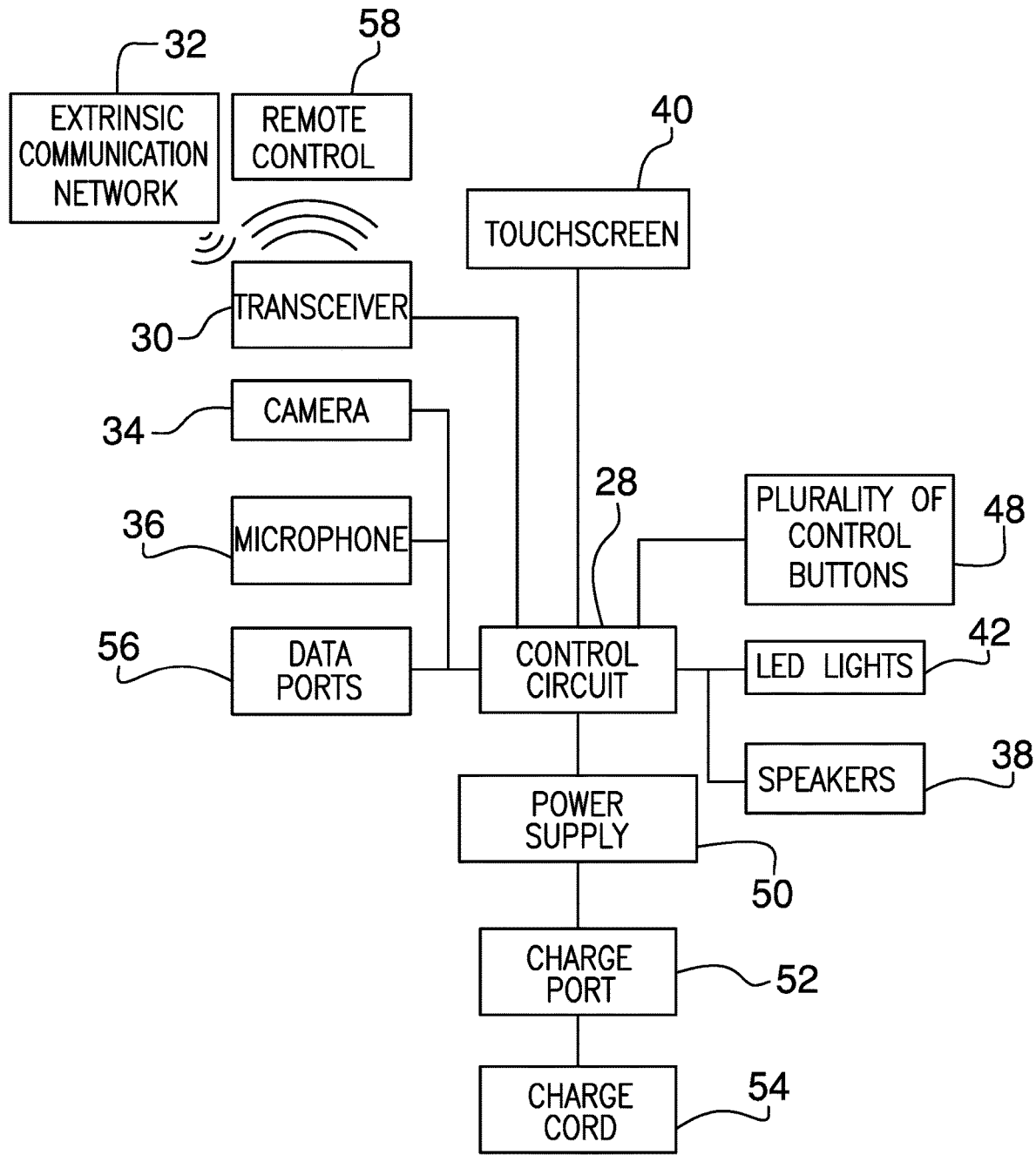
FIG. 7 is a schematic view of an embodiment of the disclosure.

With reference now to the drawings, and in particular to FIGS. 1 through 7 thereof, a new vanity device embodying the principles and concepts of an embodiment of the disclosure and generally designated by the reference numeral 10 will be described.

As best illustrated in FIGS. 1 through 7, the digital vanity mirror 12 assembly 10 includes a mirror 12 that has a reflective surface 14 and a peripheral edge 16. The reflective surface 14 is directed toward a user to provide a reflection for personal grooming. The mirror 12 may be a full body mirror or the like. A pedestal 18 is positionable on a horizontal support surface 20, such as a floor or the like. The mirror 12 is coupled to the pedestal 18 such that the mirror 12 is supported above the horizontal support surface 20. The pedestal 18 may include a base 22 and a stem 24 extending upwardly from the base 22, and the mirror 12 may be attached to a distal end 26 of the stem 24.

A control circuit 28 is coupled to the mirror 12 and the control circuit 28 may include an electronic memory. A transceiver 30 is coupled to the mirror 12, the transceiver 30 is electrically coupled to the control circuit 28 and the transceiver 30 is in electrical communication with an extrinsic communication network 32. Thus, the transceiver 30 facilitates two way communications between the user and a remote individual when the user is viewing the mirror 12. The transceiver 30 may be a radio frequency transceiver or the like and the transceiver 30 may employ a WPAN signal along with Bluetooth protocols. Additionally, the transceiver 30 may be capable of wireless communication with a wifi router or the like thereby facilitating internet connectivity.

A camera 34 is coupled to the reflective surface 14 of the mirror 12 for capturing images of the user. The camera 34 is electrically coupled to the control circuit 28 thereby facilitating the transceiver 30 to broadcast the images of the user to the remote individual for visual communication. The camera 34 may be a digital video camera or the like that is capable of both capturing both video and still images. A microphone 36 is coupled to the mirror 12 and the microphone 36 is electrically coupled to the control circuit 28.

Thus, the transceiver 30 can broadcast words spoken by the user to the remote individual for verbal communication.

A pair of speakers 38 is each of the speakers 38 is coupled to the mirror 12 for emitting audible sound outwardly therefrom. Each of the speakers 38 is electrically coupled to the control circuit 28 for broadcasting words spoken by the remote individual. A touch screen 40 is integrated into the reflective surface 14 of the mirror 12 and the touch screen 40 can be manipulated by the user. The touch screen is electrically coupled to the control circuit 28 for controlling operational parameters of the control circuit 28, the transceiver 30, the camera 34, the microphone 36 and the speakers 38. Moreover, the touch screen 40 displays indicia received from the transceiver 30. The touch screen 40 may be an LCD touch screen 40 or any other type of touch screen 40 that can be integrated into a mirror 12.

A plurality of light emitters 42 is coupled to the reflective surface 14 of the mirror 12 for emitting light outwardly therefrom. Moreover, the light emitters 42 may be distributed along each of a first lateral side 44 and a second lateral side 46 of the peripheral edge 16 of the mirror 12. Each of the light emitters 42 is electrically coupled to the control circuit 28 and each of the light emitters 42 may comprise an LED or the like. A plurality of control buttons 48 is integrated into the reflective surface 14 of the mirror 12 and each of the control buttons 48 is electrically coupled to the control circuit 28. The plurality of control buttons 48 may include a power button, a volume up button, a volume down button, a light increase button and a light decrease button.

A power supply 50 is coupled to the mirror 12, the power supply 50 is electrically coupled to the control circuit 28 and the power supply 50 comprises at least one battery. A charge port 52 is coupled to the mirror 12 and the charge port 52 is electrically coupled to the power supply 50. A charge cord 54 is electrically coupled between the charge port 52 and a power source, such as a female electrical outlet of the like, for charging the power supply 50. A plurality of data ports 56 is coupled to the mirror 12 and each of the data ports 56 is electrically coupled to the control circuit 28. The data ports 56 may include an SD card reader, a usb port and other electronic data ports common to multimedia devices.

A remote control 58 is provided and the remote control 58 is in wireless communication with the transceiver 30 via a remote transceiver 30, an infra red transmitter or any other convention, electronic means of remote control 58. The remote control 58 controls operational parameters of the control circuit 28, the transceiver 30, the camera 34, the speakers 38, the microphone 36 and the touch screen 40. A plurality of buttons 60 is positioned on the remote control 58 which may include play, pause, fast forward and reverse buttons for controlling video being played on the touch screen 40, a photo button to capture an image with the camera 34. Alternatively, the control circuit 28 may be remotely controlled with an extrinsic electronic device, such as a smart phone or the like, that is in wireless electrical communication with the extrinsic communication network 32.

In use, the mirror 12 is positioned in a location for personal grooming. The camera 34 is employed for capturing video or still photos while the user is in front of the mirror 12 and the touch screen 40 displays video received by the transceiver 30. In this way the user can record instructional videos for YouTube, Skype with loved ones and conduct any other sort of multimedia streaming while employing the mirror 12. Moreover, the user can view videos on the touch screen 40 that are broadcast on the extrinsic communication network 32, including but not being limited to, YouTube and subscription streaming services on the internet. In this way every aspect of the multimedia experience is combined with the act of personal grooming.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A digital vanity mirror assembly having a multimedia devices incorporated into a mirror, said assembly comprising:
   a mirror having a reflective surface, said reflective surface being directed toward a user wherein said mirror is configured to provide a reflection for personal grooming;
   a pedestal being positionable on a horizontal support surface, said mirror being coupled to said pedestal such that said mirror is supported above the horizontal support surface;
   a control circuit being coupled to said mirror;
   a transceiver being coupled to said mirror, said transceiver being in electrical communication with an extrinsic communication network wherein said transceiver is configured to facilitate two way communication between the user and a remote individual when the user is viewing said mirror;
   a touch screen being integrated into said reflective surface of said mirror wherein said touch screen is configured to be manipulated by the user, said touch screen being electrically coupled to said control circuit for controlling operational parameters of said control circuit and said transceiver, said touch screen displaying indicia received from said transceiver; and
   a handheld remote control being in wireless communication with said transceiver.

2. The assembly according to claim 1, further comprising:
   a camera being coupled to said reflective surface of said mirror wherein said camera is configured to capture images of the user, said camera being electrically coupled to said control circuit thereby facilitating said transceiver to broadcast the images of the user to the remote individual for visual communication;
   a microphone being coupled to said mirror wherein said microphone is configured to capture audible sounds, said microphone being electrically coupled to said control circuit thereby facilitating said transceiver to broadcast words spoken by the user to the remote individual for verbal communication; and a pair of speakers, each of said speakers being coupled to said mirror for emitting audible sound outwardly therefrom, each of said speakers being electrically coupled to said control circuit wherein each of said speakers is configured to broadcast words spoken by the remote individual.

3. The assembly according to claim 1, further comprising a power supply being coupled to said mirror, said power supply being electrically coupled to said control circuit, said power supply comprising at least one battery.

4. The assembly according to claim 3, further comprising a charge port being coupled to said mirror, said charge port being electrically coupled to said power supply.

5. The assembly according to claim 4, further comprising a charge cord being electrically coupled between said charge port and a power source for charging said power supply.

6. A digital vanity mirror assembly having a multimedia devices incorporated into a mirror, said assembly comprising:

- a mirror having a reflective surface, said reflective surface being directed toward a user wherein said mirror is configured to provide a reflection for personal grooming;
- a pedestal being positionable on a horizontal support surface, said mirror being coupled to said pedestal such that said mirror is supported above the horizontal support surface;
- a control circuit being coupled to said mirror;
- a transceiver being coupled to said mirror, said transceiver being electrically coupled to said control circuit, said transceiver being in electrical communication with an extrinsic communication network wherein said transceiver is configured to facilitate two way communication between the user and a remote individual when the user is viewing said mirror;
- a camera being coupled to said reflective surface of said mirror wherein said camera is configured to capture images of the user, said camera being electrically coupled to said control circuit thereby facilitating said transceiver to broadcast the images of the user to the remote individual for visual communication;
- a microphone being coupled to said mirror wherein said microphone is configured to capture audible sounds, said microphone being electrically coupled to said control circuit thereby facilitating said transceiver to broadcast words spoken by the user to the remote individual for verbal communication;
- a pair of speakers, each of said speakers being coupled to said mirror for emitting audible sound outwardly therefrom, each of said speakers being electrically coupled to said control circuit wherein each of said speakers is configured to broadcast words spoken by the remote individual;
- a touch screen being integrated into said reflective surface of said mirror wherein said touch screen is configured to be manipulated by the user, said touch screen being electrically coupled to said control circuit for controlling operational parameters of said control circuit, said transceiver, said camera, said microphone and said speakers, said touch screen displaying indicia received from said transceiver;
- a power supply being coupled to said mirror, said power supply being electrically coupled to said control circuit, said power supply comprising at least one battery;
- a charge port being coupled to said mirror, said charge port being electrically coupled to said power supply;
- a charge cord being electrically coupled between said charge port and a power source for charging said power supply; and
- a handheld remote control being in wireless communication with said transceiver, said remote control controlling operational parameters of said control circuit, said transceiver, said camera, said speakers, said microphone and said touch screen.

* * * * *